United States Patent
Wagh et al.

(10) Patent No.: US 10,248,641 B2
(45) Date of Patent: Apr. 2, 2019

(54) METHOD, APPARATUS, AND COMPUTER PROGRAM PRODUCT FOR MANAGING RETRIEVAL OF CONTENT FOR DISPLAY BY A BROWSER

(71) Applicant: McKesson Corporation, San Francisco, CA (US)

(72) Inventors: Rakesh Wagh, Foster City, CA (US); Shridhar Upadhyaya, Fremont, CA (US)

(73) Assignee: McKesson Corporation, San Francisco, CA (US)

( * ) Notice: Subject to any disclaimer, the term of this patent is extended or adjusted under 35 U.S.C. 154(b) by 0 days.

(21) Appl. No.: 15/476,544

(22) Filed: Mar. 31, 2017

(65) Prior Publication Data
US 2018/0285337 A1    Oct. 4, 2018

(51) Int. Cl.
| | | |
|---|---|---|
| *G06F 17/00* | (2006.01) | |
| *G06F 17/24* | (2006.01) | |
| *G06F 17/21* | (2006.01) | |
| *G06F 17/22* | (2006.01) | |
| *G06F 3/0485* | (2013.01) | |

(52) U.S. Cl.
CPC .......... *G06F 17/245* (2013.01); *G06F 3/0485* (2013.01); *G06F 17/212* (2013.01); *G06F 17/2247* (2013.01)

(58) Field of Classification Search
CPC ... G06F 17/245; G06F 17/212; G06F 17/2247
USPC ........................................ 715/227, 234, 243
See application file for complete search history.

(56) References Cited

U.S. PATENT DOCUMENTS

| | | | | | |
|---|---|---|---|---|---|
| 5,208,907 | A | * | 5/1993 | Shelton | G06F 3/0482 707/999.004 |
| 5,739,824 | A | * | 4/1998 | Dietrich | G06F 17/211 345/440 |
| 6,484,179 | B1 | * | 11/2002 | Roccaforte | G06F 17/30592 707/737 |
| 8,078,955 | B1 | * | 12/2011 | Gupta | G06F 17/245 715/212 |
| 8,677,255 | B1 | * | 3/2014 | Mitnick | G06F 8/34 715/763 |

(Continued)

OTHER PUBLICATIONS

Cohen et al., A Flexible Learning System for Wrapping Tables and Lists in HTML Documents, ACM 2002, pp. 232-241.*
Shigarow et al., Rule-based Spreadsheet Data Transformation from Arbitrary to Relational Tables, Elsevier 2017, pp. 123-136.*
Denoue et al., WebNC: Efficient Sharing of Web Applications, ACM 2009, pp. 365-366.*

*Primary Examiner* — Cong-Lac Huynh
(74) *Attorney, Agent, or Firm* — Ballard Spahr LLP

(57) ABSTRACT

A method is provided for managing retrieval of content for display in a table by a browser. When large tables of data are displayed by browsers, not all the data can be viewed at once. To improve performance, only the data in the visible portion of table may be downloaded when the user first accesses the page. The table may be divided into tiles such that each tile comprises multiple table cells, each tile to be treated as a separate component to be independent loaded and rendered. When a user accesses the page, the relevant data for the initially displayed tile(s) is downloaded from the server, stored in the browser's document object model (DOM), and rendered for display. As the user scrolls, additional data not yet stored in the DOM is downloaded, cached in the DOM and rendered.

20 Claims, 5 Drawing Sheets

(56) References Cited

U.S. PATENT DOCUMENTS

| | | | |
|---|---|---|---|
| 8,886,715 B1* | 11/2014 | Zhu | H04L 67/2847 |
| | | | 701/430 |
| 9,785,332 B1* | 10/2017 | Karppanen | G06F 3/0485 |
| 2002/0067849 A1* | 6/2002 | Klassen | H04N 1/6016 |
| | | | 382/162 |
| 2007/0236741 A1* | 10/2007 | Tai | H04N 1/40087 |
| | | | 358/3.12 |
| 2010/0158401 A1* | 6/2010 | Shiraishi | G06K 9/00228 |
| | | | 382/243 |
| 2010/0235765 A1* | 9/2010 | Worthington | G06F 17/30899 |
| | | | 715/760 |
| 2010/0268694 A1* | 10/2010 | Denoue | G06F 17/30873 |
| | | | 707/693 |
| 2013/0147846 A1* | 6/2013 | Kalai | G06T 1/60 |
| | | | 345/660 |
| 2015/0293929 A1* | 10/2015 | Namgung | G06F 3/14 |
| | | | 715/234 |
| 2016/0034576 A1* | 2/2016 | Jiang | G06F 17/30893 |
| | | | 707/702 |
| 2016/0062966 A1* | 3/2016 | Gupta | G06F 17/24 |
| | | | 715/255 |
| 2016/0162597 A1* | 6/2016 | Karppanen | G06F 17/30905 |
| | | | 715/240 |
| 2016/0342620 A1* | 11/2016 | Ebberson | G06F 17/30221 |
| 2017/0046924 A1* | 2/2017 | Buriu | G07F 17/34 |
| 2017/0351656 A1* | 12/2017 | Lysanov | G06F 17/248 |

* cited by examiner

METHOD, APPARATUS, AND COMPUTER PROGRAM PRODUCT FOR MANAGING RETRIEVAL OF CONTENT FOR DISPLAY BY A BROWSER

TECHNOLOGICAL FIELD

Embodiments of the present invention relate generally to computer technology and, more particularly, to methods, apparatuses, and computer program products for managing retrieval of content for display by a browser.

BACKGROUND

Many web based systems or services provide large amounts of data to client systems or user devices to be displayed for the user in a web browser. When a user accesses the web application, a request from the client device is transmitted to the web server. The server processes the request, as well as requests from other clients, queries a database, performs other data processing tasks, and returns the data to the client along with formatting information so that the data can be displayed in the browser.

In certain applications, the amount of data displayed by the application may span several pages such that the user must scroll to see the desired information. The amount of data made available to the user may be so extensive that attempting to retrieve all the applicable data from a database when the page is initially accessed may result in database time outs or slow response times. Some systems attempt to avoid this lag time by only loading a screen full of data at a time, but the data is discarded if the user scrolls, resulting in additional requests even if the user returns to viewing the same portion of the table.

BRIEF SUMMARY

Methods, apparatuses, and computer program products are therefore provided for managing retrieval of content for display by a browser. As mentioned above, the transmission of data between the client and server is a very expensive and resource consuming task. One solution to the problem involves caching rendered pages or rendered content at the client for further use. The client-side caching must be implemented efficiently and effectively or else this approach may require expensive maintenance. Another solution is to store the cached pages as data rather than images to avoid the need to clear or empty the cache when the browser is resized, reducing additional overhead.

The performance problems are particularly prevalent in applications that retrieve and display large amounts of data. For example, some systems use structured tables to display large grids of data, some of which could include thousands of table cells. Example embodiments provided herein may improve the efficiency of rendering content for display in the tables by populating only the data in the visible portion of the table when the user first accesses the chart. The table may be divided into tiles such that each tile comprises multiple table cells, each tile to be treated as a separate component to be independently loaded and rendered. The tiles may be loaded using optimization techniques as described further below for representing the data they contain. When a user accesses a chart, the relevant data for the initially displayed tile(s) is downloaded from the server, stored in the browser's document object model (DOM), and rendered for display.

As the user scrolls, additional data not yet stored in the DOM is downloaded, cached in the DOM and rendered for display. If the user scrolls to view a tile for which the data is already stored in the DOM, the data can be efficiently rendered without additional calls to the server. Example embodiments may therefore provide distinct advantages such as improving the browser's performance of rendering the content, thereby providing an improved user experience. Example embodiments may also distribute otherwise expensive server requests and database queries into smaller more manageable requests, reducing server-side load and improving performance of the server and database.

A method is provided for managing retrieval of content for display of a table by a browser. The method includes determining a tile layout comprising a plurality of tiles representing the table, wherein a tile comprises multiple table cells. The method may include receiving a first indication of a first subset of the plurality of tiles to be rendered, and in response to the first indication, causing data associated with the first subset of tiles to be transmitted, stored in a document object model (DOM), and rendered.

The method may further include optimizing the data associated with the first subset of tiles prior to the subset of tiles being transmitted. The method may include receiving a second indication of a second subset of tiles to be rendered, and determining whether each tile of the second subset of tiles is associated with data stored in the DOM. The method may include in an instance a particular tile of the second subset is associated with data stored in the DOM, causing the data to be accessed from the DOM and rendered. In an instance the particular tile of the second subset is not associated with data stored in the DOM, the method includes causing the data associated with the particular tile to be transmitted. In some examples, the second subset of tiles is determined based on a user input to change the displayed portion of the table.

The tile layout may be determined such that a predetermined number of tiles covers a portion of the table determined to be initially displayed. The tile layout may be determined such that no tile spans multiple functional categories, wherein a functional category is defined based on at least one of a type of data or user interface operation.

In some example, the tile layout is determined based on data returned from a database. The method may include, in response to determining the tile layout, instantiating a virtual table of empty cells in the DOM, wherein the virtual table size is determined based on the tile layout. The method may further include applying a visual effect to the empty cells. In some examples the method includes, when downloaded data is stored in the DOM, overriding the applied visual effect.

The method may further include causing a tile state to be stored in association with a session, maintaining session information and associated tile states, monitoring for updates to particular data associated with cached tiles, and in an instance the particular data has changed, transmitting changed data.

A system is provided for managing retrieval of content for display of a table by a browser. The system comprises a server and client device. The server includes at least processing circuitry configured to cause the server to at least determine a tile layout comprising a plurality of tiles representing the table, wherein a tile comprises multiple table cells, receive a first indication of a first subset of the plurality of tiles to be rendered, and in response to the first indication, causing data associated with the first subset of tiles to be transmitted to a client device. The client device may be configured to at least receive the data associated with the first subset of tiles from the server, store the data in a document object model (DOM), and cause the data to be rendered for display.

A computer program product is provided for managing retrieval of content for display of a table by a browser. The computer program product comprises at least one non-transitory computer-readable medium having computer-readable program instructions stored therein. The computer-readable program instructions comprising instructions, which when performed by an apparatus, are configured to cause the apparatus to perform at least determine a tile layout comprising a plurality of tiles representing the table, wherein a tile comprises multiple table cells. The computer-readable program instructions further comprise instructions to cause the apparatus to receive a first indication of a first subset of the plurality of tiles to be rendered, and in response to the first indication. The computer-readable program instructions further comprise instructions to cause the apparatus to cause data associated with the first subset of tiles to be transmitted, stored in a document object model (DOM), and rendered.

An apparatus is provided. The apparatus includes means for managing retrieval of content for display of a table by a browser. The apparatus includes means for determining a tile layout comprising a plurality of tiles representing the table, wherein a tile comprises multiple table cells. The apparatus includes means for receiving a first indication of a first subset of the plurality of tiles to be rendered, and means for, in response to the first indication, causing data associated with the first subset of tiles to be transmitted, stored in a document object model (DOM), and rendered.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
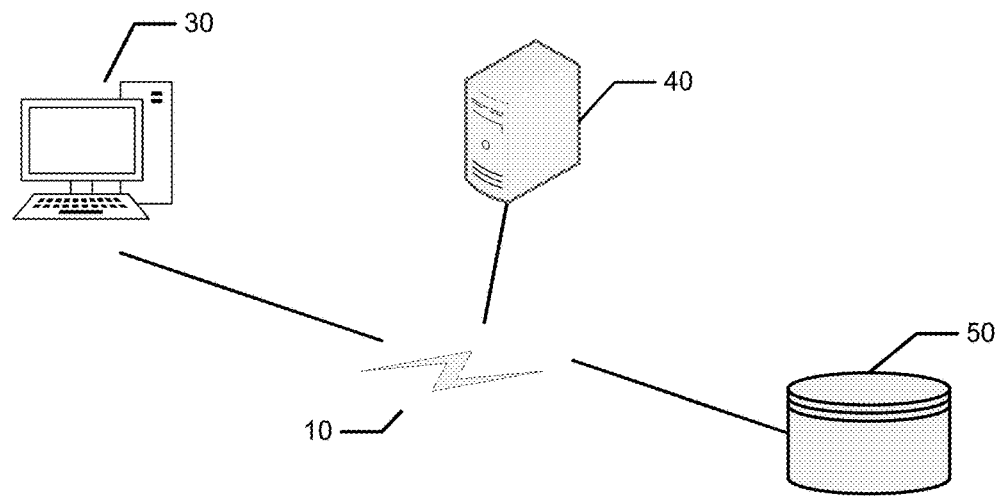
Figure 2:
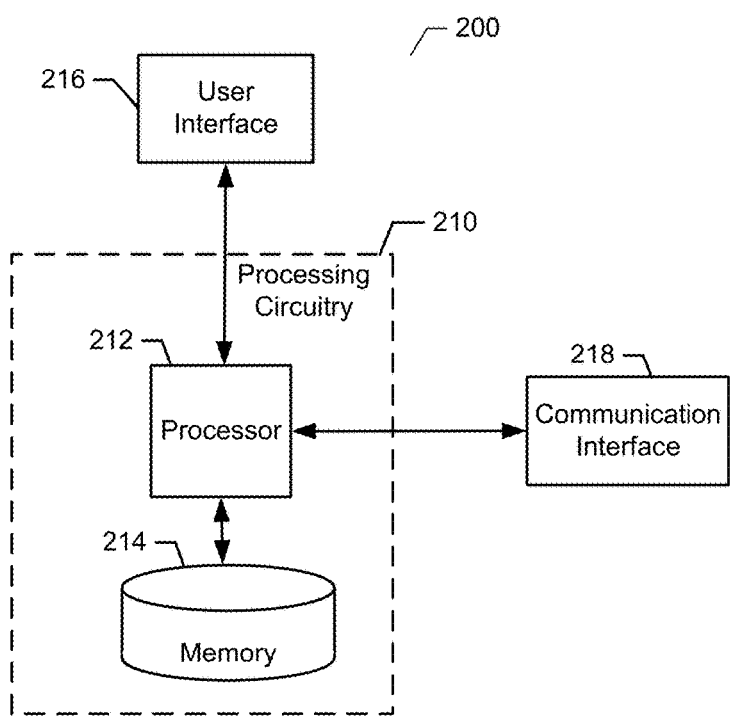
Figure 3:
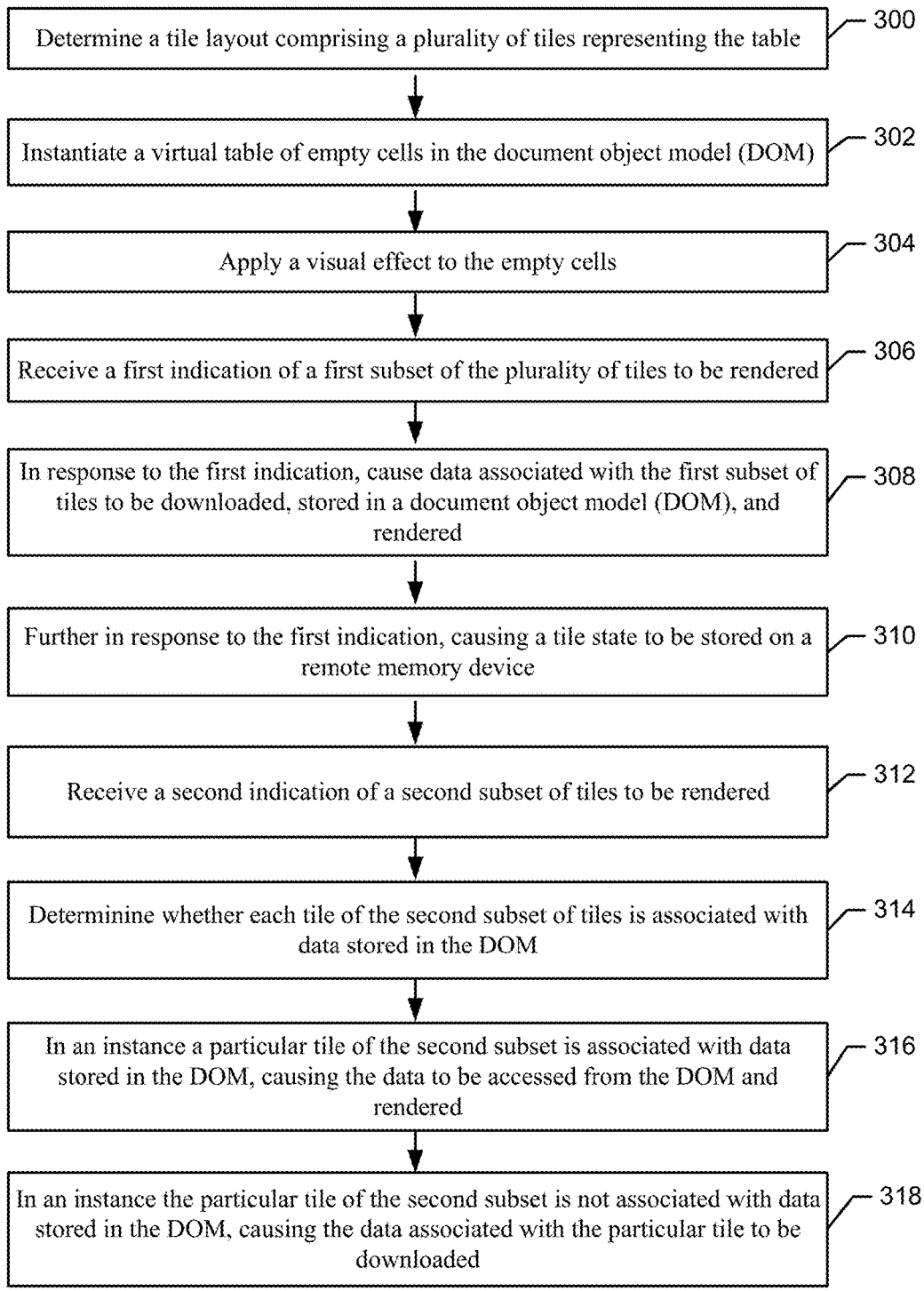
Figure 4:
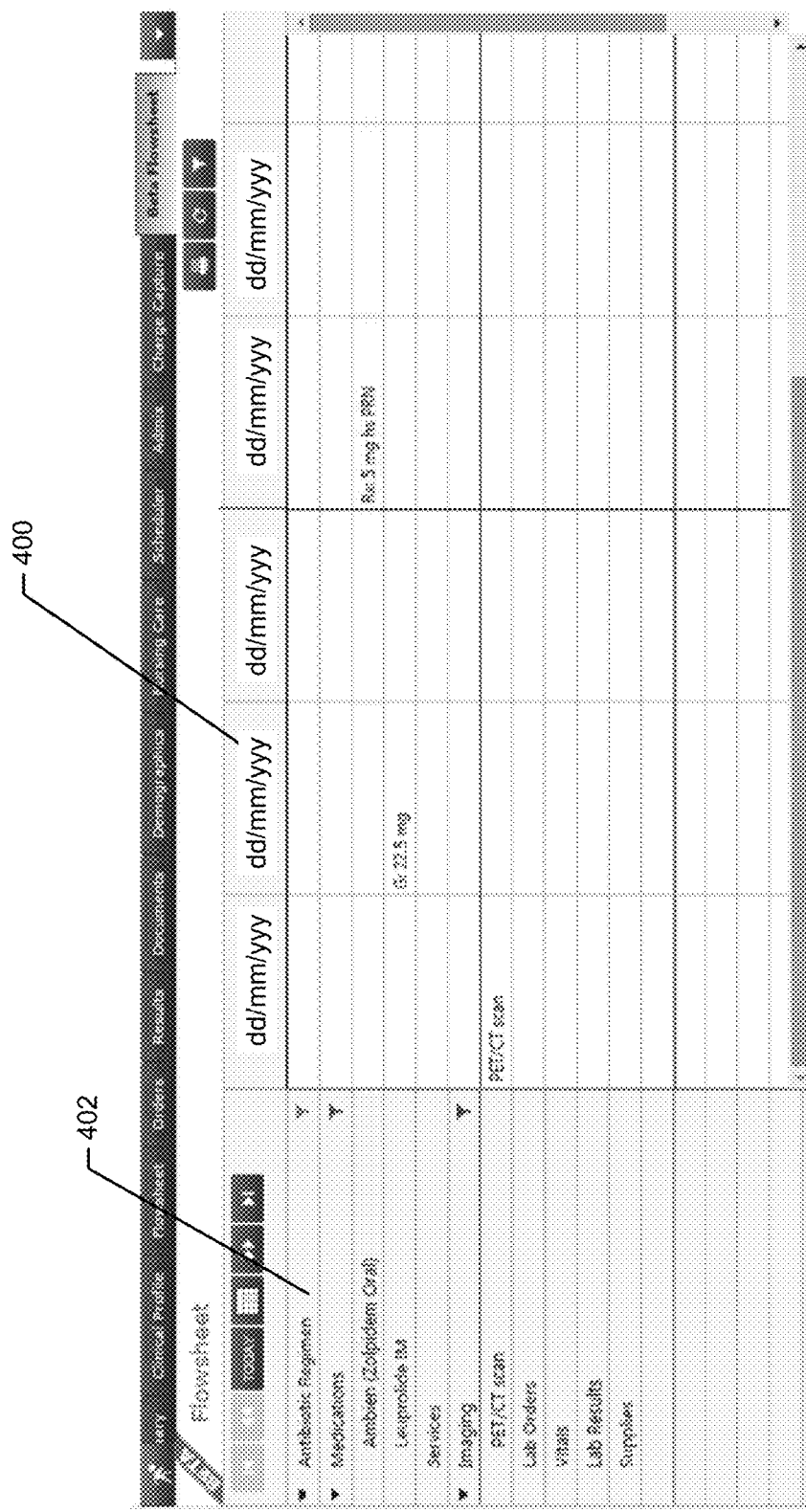
Figure 5:
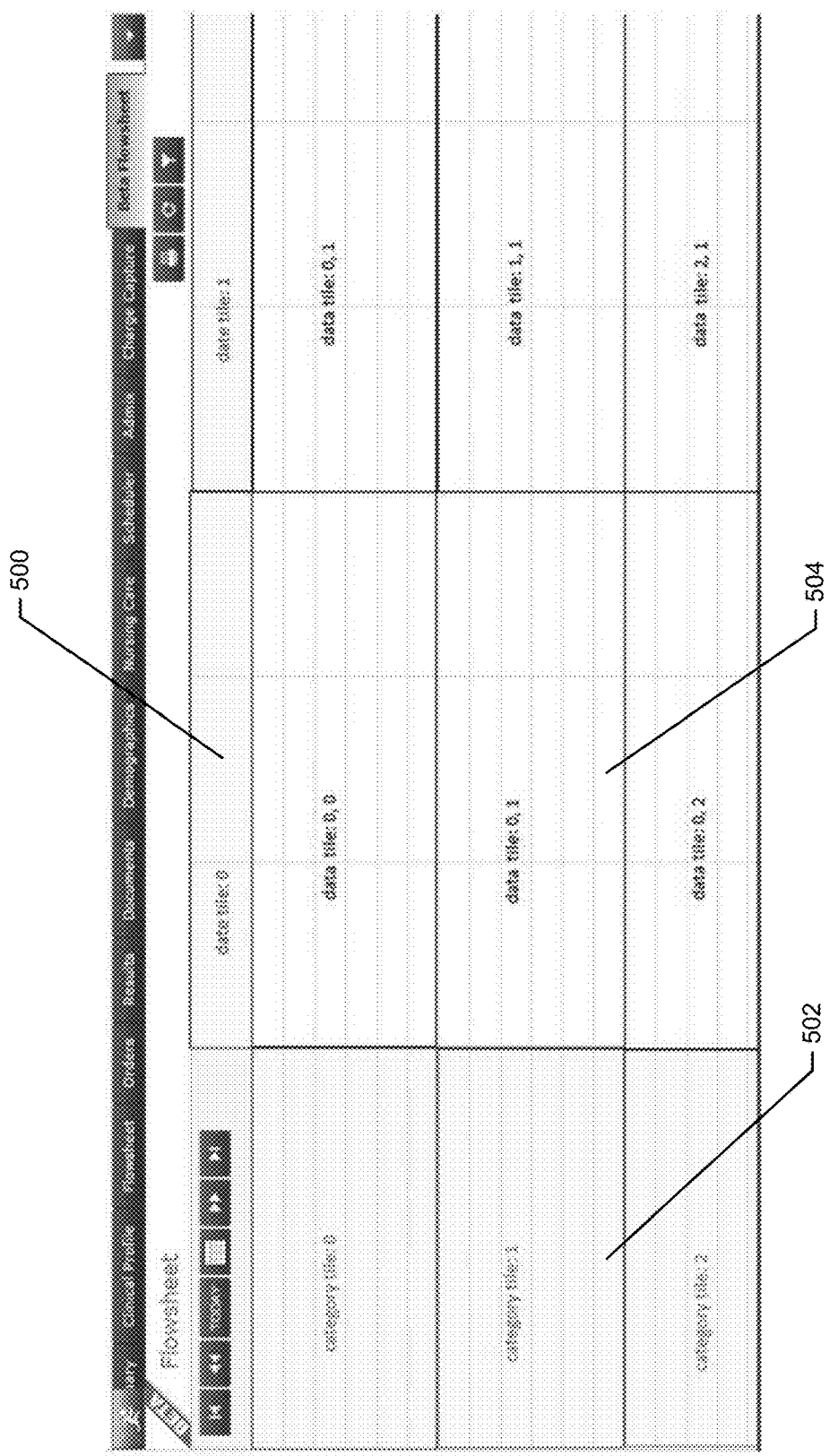
Figure 6:
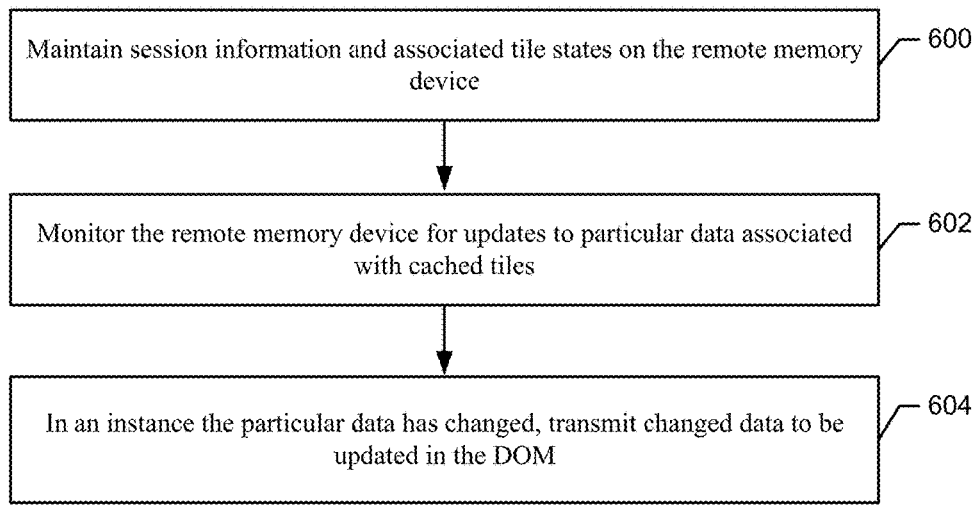

Having thus described embodiments of the invention in general terms, reference will now be made to the accompanying drawings, which are not necessarily drawn to scale, and wherein:

FIG. 1 is an overview of a system that can be used to practice some example embodiments described herein;

FIG. 2 is an exemplary schematic diagram of an apparatus in accordance with some example embodiments;

FIG. 3 is a flowchart of operations that may be performed in accordance with some example embodiments;

FIG. 4 is an illustration of an example table according to some example embodiments;

FIG. 5 is an illustration of an example tile layout according to some example embodiments; and FIG. 6 is a flowchart of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a system that can be used to practice certain embodiments described herein, and should not be considered limiting. As illustrated in FIG. 1, example embodiments may be implemented as or employed in a distributed system. The various depicted components may be configured to communicate over a network 10, such as the Internet, for example, or any other communication interface as described in further detail hereinafter. In general, client device(s) 30 may be configured to communicate with a server 40 and/or database 50. Client device 30 may include any computing device such as a personal computer, laptop, smart phone, tablet, and/or the like, and may be configured to display content in a browser. In some examples, any number of user devices 30 may be configured to communicate with server 40, which may be configured to process requests from the client device 30, provide data and content to the client device 30, and/or the like. The server 40 may be communicatively connected to database 50 which may be configured to store data, content, and/or the like. The client device 30, server 40 and/or database 50 may be configured to perform any of the operations described herein.

The system of FIG. 1 described above is provided merely as an example implementation and it will be appreciated that the example embodiments provided herein may be implemented as or employed by any number of system architectures.

Referring now to FIG. 2, apparatus 200 is a computing device(s) configured for improving the efficiency of rendering data in a browser according to example embodiments. Apparatus 200 may at least partially or wholly embody any of the network 10, client device 30, server 40, and/or database 50 described above. Apparatus 200 may therefore implement any of the client device 30, server 40, and/or database 50, in accordance with some example embodiments, or may be implemented as a distributed system that includes any of the network 10, client device 30, server 40, and/or database 50.

It should be noted that the components, devices, and elements illustrated in and described with respect to FIG. 2 below may not be mandatory and thus some may be omitted in certain embodiments. For example, FIG. 2 illustrates a user interface 216, as described in more detail below, which may be optional in the server 40 and/or database 50. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as client device 30, server, 40, database 50, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as apparatus 200, memory 214 may store data records associated with simulated requests and responses.

The memory 214 may be configured to buffer input data for processing by the processor 212. Additionally or alternatively, the memory 214 may be configured to store instructions for execution by the processor 212. In some embodiments, the memory 214 may include one or more databases, such as database 50, that may store a variety of files, contents, or data sets. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing data access operations and/or the like. In some example embodiments in which apparatus 200 is embodied as server 40, database 50, and/or the like, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst client system 102, application entity 104, application interface 106 and/or apparatus 200 over a network. Accordingly, the communication interface 218 may, for example, include supporting hardware and/or software for enabling wireless and/or wireline communications via cable, digital subscriber line (DSL), universal serial bus (USB), Ethernet, or other methods.

The network, such as network 10, in which apparatus 200 and/or any of the components described herein may operate (e.g., client device 30, server 40, database 50, or apparatus 200, and/or the like) may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like).

FIG. 3 is a flowchart illustrating example operations of an apparatus 200 according to some example embodiments.

The operations of FIG. 3 may be performed by apparatus 200 to manage the retrieval of content for display by a browser. In particular, example embodiments provide for managing retrieval of content to be displayed in a table, such as but not limited to financial data, calendar data, or any other type of records data. The following disclosure will be described with respect to the non-limiting example of a patient chart in an electronic health record.

As shown by operation 300, apparatus 200 may include means, such as processor 212, memory 214, communication interface 218, and/or the like, for determining a tile layout comprising a plurality of tiles representing the table. An example tile layout is described below with respect to FIGS. 4 and 5.

FIG. 4 illustrates an example patient chart that may be displayed by a browser. The patient chart is displayed in a browser-readable programming language table (for simplicity, the remainder of the description will use the non-limiting example of hyptertext markup language (HTML)) and includes patient health data that has been captured over time and stored in the record. The data is displayed in columns by date (e.g., column 400) and rows providing a category or descriptor of the data (e.g., Antibiotic Regimen, Medications, Services, etc.). Some categories may comprise subcategories. In some examples, the subcategories may be dynamic based on data occurring in the record. For example, medications administered or prescribed to the patient are listed as subcategory rows (e.g., Ambien, Leuprolie IM, etc.) In some embodiments the rows may be collapsible such that the user can hide or display certain rows (e.g., rows 402). In some examples, many cells are blank or empty, as there is no associated data for a particular category and date combination.

The user may apply filters and/or customize date ranges, which may result in a change in the number of rows and/or columns, such that apparatus 200 may determine a new tile layout. The user may also scroll and/or pan the table vertically and/or horizontally to access additional table cells not visible in the initial view.

In some examples, apparatus 200 may determine a maximum number of rows and/or columns that may be displayed in the chart. Some charts may have extensive amounts of data that may be accessed by a user. Consider, for example, a patient who has visited an oncology clinic two times a week for 10 years. The patient could have approximately 1,000 unique visits in that time frame and may have been administered 500 unique services such as those relating to medications, labs, supplies, and/or the like during any of the visits. Plotting the patient chart in a table may require 1,000 vertical columns and 500 horizontal rows, amounting to 500,000 table cells. Rendering such a large table upfront may be computationally intensive and may inflict performance degradation on the client device 30, server 40, and database 50. Further, in some examples, patient charts cannot be paginated because users (e.g., doctors) want to scroll through an entire patient history to have a visualization of the treatment over time. As the chart size increases, retrieval and display of the chart may become slow.

Example embodiments therefore generate a tile layout such that multiple table cells are included in a tile. Said differently, a tile may cover or encompass multiple cells of the table. The tile layout may be considered a virtual table such that the tiles are virtual cells, or virtual spaces of information. In an unloaded state (e.g, before the underlying or associated data is downloaded from the server and/or populated in the tile), a tile may be an empty virtual table cell. If data is later populated into the tile, as described in further detail below, the virtual cell may be loaded with a sub-table structure comprising the data to be displayed in the tile of the chart. Example embodiments may determine the tile layout such that there are fewer rows and columns than the table it represents. In this regard, the tile layout may also comprise fewer tiles than the number of cells in the table. The instantiation and loading of individual tiles is described in further detail below.

The tile layout may indicate how many tiles, and the respective tile sizes used to represent a table. The tile size selected will determine how many tiles are needed to represent all of the cells in the table. The tile layout and/or tile size may be determined based on a predetermined and/or preconfigured tile size, physical display size, functional categories, tile templates, data retrieved from the server 40 and/or database 50, and/or a combination thereof, as described below.

Using the example of the 500,000 cell table above, based on a tile size of 10×10 cells, example embodiments may determine a tile layout of 100×50, or 5,000 tiles or virtual cells, which in an unloaded state, may provide a 100 times reduction in the number of cells in comparison to a fully downloaded and/or rendered version of the chart.

FIG. 5 illustrates another example tile layout according to example embodiments. Tile 500 (e.g., 'date tile:0') is a 3×1 tile representing 3 table cells for displaying date column headers. Tile 502 (e.g., 'category tile:2') is a 1×6 tile representing 6 table cells for displaying category, subcategory, and/or other row titles. Tile 504 (e.g., 'data tile:0,1') is a 3×6 tile representing 18 table cells for displaying patient health data, such as measurements, readings, and/or the like.

In some embodiments, the tile size may be fixed for the column header tiles (e.g., tile 500), category tile (e.g., tile 502) and dynamic for the data tiles (e.g., tile 504).

In some examples, the tile layout and/or tile size may be determined to optimize efficiency. For example, although in certain embodiments the tile size of the column header tile and category tiles may be fixed, the tile size of the data tiles may be dynamically determined based on a variety of factors to optimize and/or improve efficiency on the client device 30, server 40, and/or database 50.

In certain instances, the tile size may be determined based in part on the initial browser and/or physical display screen size. The initial browser size, which may be based on whether or not the browser is maximized in the display, and/or set to a customized size by the user may dictate the number of columns and/or rows of the table that are displayed when the user first accesses the page, and therefore the number of tables cells. The initial display state may therefore indicate how many table cells are in view when the user initially access the page. To compensate for changes in the display state based on user scrolling and/or other factors, the apparatus 200 may additionally or alternatively utilize a display state at any given time, to determine tile layout and/or tile size. In some examples, the tile layout and/or tile sizes may be determined based on an assumption of fixed or uniform row heights and/or fixed or uniform column widths.

The tile size may be determined such that the size of the tile is smaller than the number of cells that can be displayed on the screen at a given time, or at the initial display state. This results in the viewable portion including at least two tiles that are at least partially displayed. In some examples, when the page is initially loaded and/or as a user scrolls, the visible portion of the table may include partial tiles.

When example embodiments load partially displayed tiles, the tile size may be determined such that the tiles may not be so large as to have a high percentage of the tile not displayed due to being off the viewable portion of the screen. For example, if apparatus 200 were to determine a tile size of 100% of the viewable table at an initial display state or a given display state, when shifted one column left or right, data for a second tile would be loaded to fill the entire tile even though the entire tile is not displayed. Downloading unneeded data from server 40 and/or database 50 may impact performance on any of the client device 30, server 40, and/or database 50, as a single request for data may be large.

The tile size may therefore be selected so that the tile size is not a high percentage of the viewable area of the screen. Said differently, example embodiments may determine the tile size such that a tile covers an area of the screen not exceeding a predetermined percentage of an initial view of the table On the other hand, a smaller tile size may result in a large number of tiles needed for a given display state, and a corresponding number of calls to the sever 40 and/or database 50. Further, a tile size that is too small may result in apparatus 200 not having as many opportunities for optimizing the tile data when transmitting the data from the server 40 to client device 30, as described further below.

Additionally, in some embodiments, it may be advantageous to select a tile size such that some number of the tiles covers 100% of the table in an initial display state or given display state. For example, if the viewable portion of a table at an initial display state or given display state includes 20 rows and 20 columns, the tile size determined may be 5×5 so that eight tiles cover exactly 100% of the displayed portion. In this way, at initialization (e.g., initial display state), there would be no partially displayed tiles, and therefore no loading of data that is not displayed.

In some embodiments, the apparatus 200 may configure the tile layout such that a predefined number of tiles (e.g., 4) is always determined. In this way, the apparatus 200 may determine the size of the cells such that the predetermined number of tiles most covers the entire viewable portion, with as small a portion of tiles possible not displayed. In the previous example, the table of 20 row and 20 columns may result in a tile size of 10×10 being selected by the apparatus 200 such that four tiles represent the full displayed portion at an initial display state or a given display state. The predetermined number of tiles may therefore be determined and/or adjusted to satisfy performance goals or thresholds.

As another example, the tile size and/or layout may be dynamically determined based on the type of underlying data. For example, cells known to include images or other rich data may result in a smaller tile size. As yet another example, the tile layout may be driven by functional categories. For example, the tile size may be configured such that a tile covers a category (e.g., Medications). A functional category may be any grouping of rows and/or columns in which the rows and/or columns are related based on a common feature or similarity. The common feature or similarity may relate to the type of data collected. As another example, the common feature or similarity may relate to user interface operations or functionality. For example, a group of rows or columns having a common functional category may be expanded or collapsed as a group. In such an example the number of rows may vary depending on the user selection of rows to be displayed and/or data retrieved from the server 40 and/or database 50. In this regard, the tile size may be determined based on the data retrieved from the server 40 and/or database. For example, the number of medications as returned by the database may impact the number of rows in the medication category. Therefore the tile size may be dynamically determined based on the data returned from the database, which may be based on session information, such as a particular patient for which a patient chart is being accessed. Similarly, a tile size may be selected to match the size of a common component of the system. For example, in the health care embodiments, a tile size may be selected that is based on the size of a flowsheet (e.g., patient chart) since many flowsheets may need to be eventually loaded in their entirety.

In some examples, apparatus 200 may determine a maximum and/or minimum number of rows and/or columns for a tile. The maximum and/or minimum number of rows and/or columns may be preconfigured and stored on memory. The following examples relate to a vertical limit (e.g., number of rows) for a tile based on category size. It will be appreciated that the following examples may be applied to columns and/or other categorizations of data.

As mentioned above, the tile size may be at least partially determined based on functional categories of data. For example, if the medication category has 3 rows and lab results have 5 rows, the medication tiles may have 5 rows and lab result tiles may have 3 rows. However, in some embodiments, tiles may also have a minimum and maximum number of rows that can go in a tile.

For example, if a particular category, such as medication, has 10 rows, and if the maximum number of rows per tile is 7, and the minimum number of rows per tile is 3, apparatus 200 may generate the tile layout such that tiles covering the medication category includes tiles having 7 rows and tiles having 3 rows. As another example, the tiles may be split such that an even or as close to even distribution as possible is achieved, such as 2 rows of tiles each having 5 rows of data.

In some examples, if the number of rows in a category group are less than the minimum number of rows per tile, a tile may cover more than one category. At least one advantage of a dynamic tiling method as described above is that when collapsible rows are collapsed, collapsed tile content may not have to be recalculated, downloaded, and/or the like. Only the collapsed tile set will shrink such that the header row only is displayed.

In some embodiments, expand and collapse operations, filtering, and/or other type search or filtering operations may trigger a refresh of rows. Even if tiling is used, but only a fixed tile size is used, when categories are expanded and/or collapsed, rows for the underlying subcategories may need to be recomputed and/or download, as well as tiles for rows appearing below the collapsed and/or expanded category.

According to example embodiments, dynamically determining tile layout based on functional categories, and which categories have associated collapse and expand functionality, enables apparatus 200 to eliminate, or reduce, the necessity to re-compute and/or download the tile and tiles appearing beneath the collapsed and/or expanded categories. It will be appreciated that a similar concept may be applied to collapsing and/or expanding columns, and/or applying filters, or other criteria. As such, in certain embodiments, a tile layout may be determined such that no tile spans multiple functional categories, or groupings of rows or columns. This may prevent apparatus 200 from requiring a refresh of tiles and/or tile layout in response to a user interface operation, such as but not limited to expand, collapse, filter, search, and/or the like. In the above example in which the number of medications returned from database 50 can be variable, and the category row is collapsible and/or expandable, the tile layout and/or size may therefore be dependent on the data returned from the database 50.

In some examples, tiles created as described herein can be predetermined and stored in the database 50. Loading the precomputed tiles from the server 40 and/or database 50 allows apparatus 200 to optimize the process, because the tiles are created only once and then possibly changed later only if necessary as described below with server side tracking and state monitoring.

Additionally or alternatively, any combination of tile layouts and/or sizes may be determined. In FIG. 5, the apparatus 200 determines a tile layout such that the tiles representing column and row headers (e.g., tiles 500 and 502, respectively), are specified respective sizes, and the data tiles such as tile 504 may be different sizes.

It will be appreciated that apparatus 200 may determine the tile layout in a variety of ways and the provided examples are not intended to be limiting.

In some examples, once the tile layout is determined, in operation 302, apparatus 200 may include means, such as processor 212, memory 214, communication interface 218, and/or the like, for instantiating a virtual table of empty cells in the DOM, with each cell of the DOM representing a tile of the table. The size of the virtual table may be determined based on the tile layout. The DOM may be considered an application programming interface (API) configured for storing data in a tree-like structure (e.g., HTML, extensible markup language (XML), and/or the like) for access by the browser. The DOM may therefore be stored locally on client device 30 and may be maintained by the browser application. In this regard, the DOM may be populated with placeholder data elements, each representing a tile according to the tile layout.

For example, based on the above example of a 500,000 cell table being represented by a tile layout or virtual table of 5,000 tiles, the virtual table of 5,000 cells may be instantiated in the DOM. In other examples, the DOM is not loaded with any information until the corresponding tiles are loaded for display, as further described below.

In some examples, placeholder empty rows and/or cells may be instantiated within the DOM without necessarily instantiating the sub-tables. For example, based on the 5,000 cell virtual table, a 10×10 table that may ultimately be instantiated within each of or any of the 5,000 cells, may not necessarily be instantiated until the data is requested, as described in further detail below. This may provide for improved performance whereas instantiating 500,000 table cells at initial page load may cause lag in the browser and throughout the system. Further, if the user does not scroll to some of the titles, such as those appearing covering the outer columns or rows of the tables, the sub-tables may not ever need to be instantiated during the session. In some examples, sub-tables are created in the placeholder cells only as requested based on the tile appearing in the viewable screen space. If the placeholders are not visible, they are always empty. This is one of the important thing that make the system fast and compact.

In some examples, the DOM may be initially populated according to tile templates, described in further detail below. For example, given the examples tiles of FIG. 5, a tile template may be used to represent each of a column header tile (e.g., tile 500), category tile (e.g., tile 502), and data tile (e.g., tile 504). A tile template may be implemented with a browser-readable programming language, such as cascading style sheets (CSS) and/or HTML, for example, that indicates style and formatting information including but not limited to layout, color, and font. A tile may therefore be cloned (e.g., duplicated), or generated from the template, and placed it in appropriate position in the virtual table in the DOM with respect to other tiles in the table. The html representing template tile may be stored in memory of the client device 30, such as the browser cache, for access by the browser.

As shown by operation 304 in FIG. 3, apparatus 200 may include means, such as processor 212, memory 214, user interface 216, communication interface 218, and/or the like, for applying a visual effect to the empty cells. In some embodiments, the visual effect may be dictated by a tile template.

The visual effect may be applied to a tile for which the data is not yet downloaded, which may include all the tiles at initial instantiation in the DOM. Applying a visual effect may allow the user to recognize that the data is not yet loaded and to differentiate an unloaded tile from a loaded tile merely having no data returned (e.g., empty cells in the chart). The visual effect may only be visible to the user (e.g., milliseconds or seconds) until the data is loaded. Examples of visual effects may include blurring the tile, modifying the color or brightness relative to the table, and/or the like. The visual effect may be implemented by applying default HTML styles to the empty cells when the virtual tables of empty cells (e.g., tiles) are initially instantiated in the DOM. For example, the default styles may be indicated in the tile templates.

As shown by operation 306, apparatus 200 may include means, such as processor 212, memory 214, communication interface 218, and/or the like, for determining a first indication of a first subset of the plurality of tiles to be rendered. The first subset of the plurality of tiles may be determined based on the table cells appearing in the viewable portion on the table in the browser and may depend on the browser size, applied filters, date ranges and/or the like. In some examples, the first subset of tiles may be based on the tiles that are displayed when a user initially accesses the page or chart. If any tiles are partially displayed, such as tiles 'category tile:2,' 'data tile:0,2,' and 'data tile:2,1' in FIG. 5, the tiles may be included in the first subset. Tiles outside of the displayed area (e.g., off-screen) may not be included in the first subset of tiles. Said differently, the tiles outside of the displayed area or off-screen may be excluded from the first subset of tiles.

In operation 308, apparatus 200 may include means, such as processor 212, memory 214, user interface 216, communication interface 218, and/or the like, for in response to determining the first indication, causing data associated with the first subset of tiles to be downloaded, stored in a document object model (DOM), and rendered. In this regard, apparatus 200 may transmit a request to server 40, which may process the request. The server 40 may in turn query database 50 to retrieve requested data, optionally perform additional processing, and return the data to the client device 30. In this regard, the relevant data associated with table cells represented by the first subset of tiles may be downloaded on the client device 30.

To reduce the amount of data needed to be transferred between the server and client, the server may optimize the data in each tile before transmitting the tile data to the client. As such, apparatus 200 may include means, such as processor 212, memory 214, user interface 216, communication interface 218, and/or the like, for transmitting only the data for which table cells will be populated. In this regard, no data, or null values may be transmitted from the server 40 to the client terminal 30 when it is determined that a table cell will be blank.

In some embodiments, if the tile requested does not contain any data, the server may send a null identifier rather than empty cells. In this way, a single null identifier will reduce the data to be transferred. The user interface may reflect the same empty tile as if empty cells were included in the tile.

Similarly, if a tile contains blank rows or columns, the apparatus 200, such as server 40, may generate the response such that the entire blank row or column is represented by a single null identifier. In some instances, there may be more than one contiguous empty row or column, in which case the apparatus 200, such as server 40, could represent all blank rows and columns in the contiguous range with a single null identifier and an indication of the rows and columns that are blank. For example, if for a 5×5 tile, apparatus 200, such as server 40 determines that the first four rows are blank and the final row includes five values of "A, B, C, D, E," the data sent from the server may include a single null for rows 1-4 followed by "A, B, C, D, E" for row 5, or something similar. In this way, there is no need to represent every blank cell or every blank row with a null identifier. In another example, if for a 5×5 tile the apparatus 200 determines the first row has five values of A, B, C, D, E, followed by four blank rows, the data sent from the server may include A, B, C, D, E for row 1, followed by a single null for rows 2-5 or no data for rows 2-5. The client device 30 may be configured to process the received data such that anything after the last received data in a tile is null, in which case, in the example above, the server may not even send a null for rows 2-5.

In additional embodiments, if apparatus 200, such as server 40, determines the tile contains one or more rows or columns with more than one contiguous blank cell, the server can represent the contiguous group of blank cells with a single null identifier and an indication of the contiguous blank cells. For example, if apparatus 200, such as server 40, determines a row includes blank, blank, blank, B, C, the server may transmit a single null for cells 1-3, followed by B, C. In some cases, the end of a row may contain one or more blanks. In these instances, as similar to the above, the server may simply send nothing after the last data in the row. For example, if the row contained B, C, blank, blank, blank, the server may simply send B, C.

Apparatus 200 (e.g., client device 30), may then populate the DOM with the data values received from server 40. In this regard, the first time data is loaded into the DOM for a particular tile, an HTML table (e.g., a sub-table) representing the tile may be instantiated within the placeholder elements which may have been generated according to a tile template. As another example, the first time data is loaded into the DOM for a particular tile, apparatus 200 may access the template to apply the layout, font and style. In some examples, only the actual cells comprising data may be instantiated. For example, for a 3×3 tile having an empty row(s), example embodiments may not necessarily need to instantiate 3 empty cells in the row. This approach may enable example embodiments to limit unnecessary operations and to conserve memory on the client device 30.

The data populated in the DOM may include raw data such as but not limited to medication dosages, vital signs and other measurements, links to other content such as documents, files, image data, embedded components, and/or the like. In this regard, the raw data stored in the DOM may reference cached pages, images or components in the browser cache but that are not stored in the DOM. The data may also include formatting data and/or styles for the tile (e.g., the associated sub-table).

It will be appreciated that not all the data returned from the server 40 may necessarily be stored in the DOM. Some data such as images, styles, and/or the like, may be stored in the browser cache, which may be separate from the DOM.

For example, the default visual effect used to indicate the data is not yet loaded, may be overwritten or changed such that the user recognizes the tile is updated to reflect downloaded data. This may be particularly important when a tile has been downloaded but contains no data (e.g., there is no applicable data for the particular rows and columns covered by the tile).

Apparatus 200 may additionally cause the data to be rendered by the browser for display.

In some examples, in operation 310, apparatus 200 may include means, such as processor 212, memory 214, communication interface 218, and/or the like, for further in response receiving the first indication from client 30, causing a tile state to be stored on a remote memory device, such as database 50 and/or a memory device of server 40, for example. The tile state may be any data or indicator indicative of the caching of the underlying table data in the DOM of the client device 30. For example, the server may comprise a representation of the tile layout and store an indication of which tiles have been requested, in some instances along with a timestamp of the request. Storing the tile states enables apparatus 200, such as with server 40, to be aware of which tiles have been requested by client 30 during a client session. Similarly, the tile state may be used to notify the client device 30 if updates are made to the data stored in the DOM of an active browser session. For example, the server may determine that the data in a tile has changed since the timestamp stored by the server for that tile. This process is described in further detail with respect to FIG. 6 below.

In operation 312, apparatus 200 may include means, such as processor 212, memory 214, user interface 216, communication interface 218, and/or the like, for receiving a second indication of a second subset of tiles to be rendered. In this regard, a user input provided via user interface 216 may cause the viewable tiles of the chart to change such that additional tiles come into view. Examples of the user input may include but are not limited to scrolling, panning, zooming, resizing the browser, expanding or collapsing rows, and/or the like. The second subset of tiles may therefore include the tiles that are displayed or are moving into the displayed view as a result of the user input.

It will be appreciated that resizing the browser does not necessarily cause the cached data in the DOM to be cleared. Since the cached HTML data can be rendered for display in a browser of any size, the data does not need to be refreshed. Instead, the browser may determine which tiles should be displayed for the resized browser and retrieve the corresponding data for those tiles from the DOM. This provides performance improvements on the client device 30 in comparison to some alternative implementations. As described above, when the user performs an input that causes new tiles to come into view, the tiles may be initially displayed with a visual effect until the associated data is downloaded and/or rendered.

As another example, the second subset of tiles may include tiles that are determined as likely to come into the display view. For example, as the user scrolls to view different areas of the table, the apparatus 200 may reasonably predict the tiles which are about to be requested for rendering so that the data is readily available in the DOM for efficient rendering. In some instances, the apparatus 200 may identify contiguous or closely neighboring data in a neighboring tile or tiles that are not displayed and predict that the user will continue scrolling to view the neighboring tiles.

In some embodiments, even if the user is not scrolling or performing a user input, apparatus 200 may determine that the next tiles surrounding the displayed tiles (e.g., above, below, to the right, and/or left) of the displayed tiles may be the next requested tiles. In this regard, the second indication of the second subset of tiles to be rendered may be automatically generated such that the next tiles predicted to be displayed are pre-fetched or downloaded accordingly as described below. The apparatus may determine a time of low usage to avoid using resources when transferring the predicted tiles.

In operation 314, apparatus 200 may include means, such as processor 212, memory 214, communication interface 218, and/or the like, for determining whether each tile of the second subset of tiles is associated with data stored in the DOM. The apparatus 200 (e.g., client device 30) may access the DOM to determine whether the tile has been populated with data or is an empty cell.

In operation 316, apparatus 200 may include means, such as processor 212, memory 214, communication interface 218, and/or the like, for in an instance a particular tile of the second subset is associated with data stored in the DOM, causing the data to be accessed in the DOM and rendered. In this regard, tiles that have already been loaded into the DOM (e.g. tiles previously viewed by the user, and that the user has returned to such as by scrolling), may be retrieved from the DOM. A call to the server 40 and/or database 50 may not be needed and thus may limit or reduce server and/or database load. In other instances, the client may send a request to the server to determine if the data in the previously loaded tiles have changed. In this regard, the client may include a timestamp of when the data for the previously loaded tile was received so the server may determine if changes have been made since that timestamp.

In operation 318, apparatus 200 may include means, such as processor 212, memory 214, communication interface 218, and/or the like, for in an instance the particular tile of the second subset is not associated with data stored in the DOM, causing the data associated with the particular tile to be downloaded. In this regard, apparatus 200 determines the data needs to be downloaded from the server 40 and/or database 50. Operations 308 and 310 may therefore be repeated or performed with the additional tile(s) of the second subset. Said differently, the additional tile(s) from the second subset may be rendered for display, the data stored in the DOM, and the tile state optionally updated on server 40 and/or database 50.

As described above with respect to operation 310, apparatus 200 (e.g., client 30) may provide tile state information to server 40 and/or database 50. In this regard, server 40 may track the sessions of multiple client devices 30 and provide efficient updates to client devices 30 in instances in which cached data has been updated. Particularly in a multi-user environment, a user may provide inputs that should be reflected on another user's device so that stale data may be efficiently updated.

FIG. 6 is a flowchart of operations performed by example embodiments for monitoring client sessions and tile states. The operations of FIG. 6 may be performed by server 40 and/or database 50, for example. In operation 600, apparatus 200 may include means, such as processor 212, memory 214, communication interface 218, and/or the like, for maintaining session information and associated tile states on the remote memory device. In this regard, the server 40 may store session information, including a session identifier, associated tile states, timestamps, and/or the like as requests are received from the client device 30. The server 40 may therefore store which tiles of the virtual table for a particular client session have been cached by the client device 30 in the browser's DOM, and/or which tiles have not been cached. If the client browser session is terminated (e.g., the browser window is closed), the server 40 and/or database 50 may disregard or delete the session information and associated tile states.

If a user changes a filter or some other criteria such that the number of columns or rows of the table changes, the tiles may be expired and/or marked for refresh. In this regard, the filtering of cells or hiding of rows or columns may cause the overall number of relevant cells in the table to change. To maintain the same size tiles within the table, the cached tiles may be expired or marked for refresh as the data in those tiles may have been affected by the filtering or hiding. In other instances, the metadata used to represent the table may be affected by the filtering or hiding, and therefore the cached data may need to be refreshed or cleared.

In operation 602, apparatus 200 may include means, such as processor 212, memory 214, communication interface 218, and/or the like, for monitoring the remote memory device (e.g., memory 214) for updates to particular data associated with cached tiles. The sever 40 (e.g., apparatus 200) may monitor the underlying data values of the tiles that have been previously loaded and cached in the client's DOM, and determine if there are any changes to data values affecting the cached tile data in the DOM. For example, if multiple users are accessing the server 40 and/or database 50 via different client devices 30, some data may be changed. In this regard, the tile state on the server 40 and/or database 50 indicates the tile is cached in a client device 30's DOM, and that an associated data value has changed.

Accordingly, in an instance the particular data has changed, in operation 604, apparatus 200 may include means, such as processor 212, memory 214, communication interface 218, and/or the like, for transmitting data (e.g., to the client device 30) to be updated in the DOM. In other instances, the server may send a notification to the client rather than the data to indicate that the data is outdated. The client may then request the new data if the corresponding tile is currently displayed, or wait to request the data when the tile is redisplayed if the tile is not currently displayed. In yet other instances, the server may store an indication that the data has changed so that if a subsequent request is received from the client, the server will know to update the data.

In some embodiments, the server 40 may poll or query the database 50 to monitor tile states associated with different sessions and/or to determine if relevant data has changed. The server 40 may poll the database on a predetermined time interval, such as every 60 seconds, for example, to check for updates to any cached tiles associated with active sessions on client devices 30. The apparatus 200 may push (e.g., transmit) the updated or new data value to the client device 30 to be updated in the DOM. In other instances, the server may send a notification to the client rather than the data to indicate that the data is outdated. The client may then request the new data if the corresponding tile is currently displayed, or wait to request the data when the tile is redisplayed if the tile is not currently displayed. In yet other instances, the server may store an indication that the data has changed so that if a subsequent request is received from the client, the server will know to update the data. In instances in which no updates to the underlying data have been made, the apparatus 200 may not need to transmit data from the server 40 to the client device 30, as it is determined the client device 30 is storing accurate data. As such, communication between the client device 30 and server 40 may be limited or reduced in comparison to implementations in which client-side states are not tracked by the server 40.

The method, apparatus, and computer program described herein according to example embodiments therefore provide a seamless user experience in which the page may be quickly loaded at first access, and the relevant data may be populated in real-time or near real-time as the user scrolls.

Many other technical advantages are provided by example embodiments of the apparatus 200.

Caching raw data in the DOM may conserve processing resources on the client device 30. A browser resize operation according to example embodiments may not necessitate that all cached data be discarded and downloaded again, as is the case in some alternative implementations. This difference may improve performance on both the client device 30 and server 40 in example embodiments.

Moreover, requests to the server 40 and/or database 50 may be smaller and less resource-intensive relative to requests associated with downloading data for an entire table. This may minimize server load, database timeouts, and improve performance on the server, database, and throughout the system.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIGS. 3 and 6 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for managing retrieval of content for display of a table by a browser, the method comprising:
determining a tile layout comprising a plurality of tiles representing the table, wherein a tile comprises multiple table cells;
receiving a first indication of a first subset of the plurality of tiles to be rendered;
in response to the first indication, causing data associated with the first subset of tiles to be transmitted, stored in a document object model (DOM), and rendered;
receiving a second indication of a second subset of tiles to be rendered;
determining whether each tile of the second subset of tiles is associated with data stored in the DOM;
in an instance a particular tile of the second subset is associated with data stored in the DOM, causing the data to be accessed from the DOM and rendered; and
in an instance the particular tile of the second subset is not associated with data stored in the DOM, causing the data associated with the particular tile to be transmitted.

2. The method of claim 1, further comprising:
optimizing the data associated with the first subset of tiles prior to the first subset of tiles being transmitted.

3. The method of claim 1, wherein the second subset of tiles and the first subset of tiles are contiguous.

4. The method of claim 1, wherein the second subset of tiles is determined based on a user input to change the displayed portion of the table.

5. The method of claim 1, wherein the tile layout is determined such that a predetermined number of tiles covers a portion of the table determined to be initially displayed.

6. The method of claim 1, wherein the tile layout is determined such that no tile spans multiple functional categories, wherein a functional category is defined based on at least one of a type of data or a user interface operation.

7. The method of claim 1, wherein the tile layout is determined based on data returned from a database.

8. The method of claim 1, further comprising:
in response to determining the tile layout, instantiating a virtual table of empty cells in the DOM, wherein the virtual table size is determined based on the tile layout; and
applying a visual effect to the empty cells.

9. The method of claim 8, further comprising:
when downloaded data is stored in the DOM, overriding the applied visual effect.

10. The method of claim 8, further comprising:
causing a tile state to be stored in association with a session;
maintaining session information and associated tile states;
monitoring for updates to particular data associated with cached tiles; and
in an instance the particular data has changed, transmitting changed data.

11. A system for managing retrieval of content for display of a table by a browser, the system comprising:
(a) a server comprising at least processing circuitry configured to cause the server to at least:
determine a tile layout comprising a plurality of tiles representing the table, wherein a tile comprises multiple table cells;
receive a first indication of a first subset of the plurality of tiles to be rendered; and
in response to the first indication, causing data associated with the first subset of tiles to be transmitted to a client device;
and
(b) the client device, configured to at least:
in response to determining the tile layout, instantiate a virtual table of empty cells in a document object model (DOM), wherein the virtual table size is determined based on the tile layout;
apply a visual effect to the empty cells of the virtual table;
receive the data associated with the first subset of tiles from the server;
store the data in the DOM; and
cause the data to be rendered for display.

12. The system of claim 11, wherein the processing circuitry is further configured to cause the server to:
optimize the data associated with the first subset of tiles prior to the first subset of tiles being transmitted.

13. The system of claim 11, wherein the client device is further configured to:
receive a second indication of a second subset of tiles to be rendered;
determining whether each tile of the second subset of tiles is associated with data stored in the DOM;
in an instance a particular tile of the second subset is associated with data stored in the DOM, cause the data to be accessed from the DOM and rendered; and
in an instance the particular tile of the second subset is not associated with data stored in the DOM, cause the data associated with the particular tile to be transmitted.

14. The system of claim 13, wherein the second subset of tiles is determined based on a user input to change the displayed portion of the table.

15. The system of claim 11, wherein the tile layout is determined such that a predetermined number of tiles covers a portion of the table determined to be initially displayed.

16. The system of claim 11, wherein the tile layout is determined such that no tile spans multiple functional categories, wherein a functional category is defined based on at least one of a type of data or a user interface operation.

17. The system of claim 11, wherein the tile layout is determined based on data returned from a database.

18. The system of claim 11, wherein the virtual table comprises a number of empty cells that is less than a number of the multiple table cells.

19. The system of claim 11, wherein the processing circuitry is further configured to cause the server to:
cause a tile state to be stored in association with a session;
maintain session information and associated tile states;
monitor for updates to particular data associated with cached tiles; and
in an instance the particular data has changed, transmit changed data.

20. A computer program product for managing retrieval of content for display of a table by a browser, the computer program product comprising at least one non-transitory computer-readable medium having computer-readable program instructions stored therein, the computer-readable program instructions comprising instructions, which when performed by an apparatus, are configured to cause the apparatus to perform at least:
determine a tile layout comprising a plurality of tiles representing the table, wherein a tile comprises multiple table cells;
in response to determining the tile layout, instantiate a virtual table of empty cells in a document object model (DOM), wherein the virtual table size is determined based on the tile layout;
apply a visual effect to the empty cells of the virtual table;
receive a first indication of a first subset of the plurality of tiles to be rendered;
in response to the first indication, cause data associated with the first subset of tiles to be transmitted, stored in the DOM, and rendered; and
override the applied visual effect when downloaded data is stored in the DOM.

* * * * *